(12) United States Patent
Bertrand et al.

(10) Patent No.: US 6,286,640 B1
(45) Date of Patent: Sep. 11, 2001

(54) LONGITUDINAL AXIS SHOCK ABSORBER WITH BYPASS CHANNEL

(75) Inventors: Michel Bertrand, Cluses; Jean-Pierre Perret, Thyez, both of (FR)

(73) Assignee: Etablissements Jean Perret, Cluses (FR)

(*) Notice: Subject to any disclaimer, the term of this patent is extended or adjusted under 35 U.S.C. 154(b) by 0 days.

(21) Appl. No.: 09/091,115

(22) PCT Filed: Dec. 9, 1996

(86) PCT No.: PCT/FR96/01958

§ 371 Date: Sep. 23, 1998

§ 102(e) Date: Sep. 23, 1998

(87) PCT Pub. No.: WO97/21937

PCT Pub. Date: Jun. 19, 1997

(30) Foreign Application Priority Data

Dec. 13, 1995 (FR) .................................................. 95 15096

(51) Int. Cl.[7] ....................................................... F16F 9/00
(52) U.S. Cl. ......................................... 188/318; 188/322.19
(58) Field of Search .................................... 267/136, 127; 188/316, 317, 318, 322.19, 322.22, 266

(56) References Cited

U.S. PATENT DOCUMENTS

| | | | | |
|---|---|---|---|---|
| 1,137,123 | * | 4/1915 | Fernanzo | 188/317 |
| 2,299,216 | * | 10/1942 | Ericsson | 267/64.28 |
| 2,410,176 | * | 10/1946 | Magrum | 188/317 |
| 3,151,856 | * | 10/1964 | Bresk et al. | 188/317 |
| 3,726,368 | * | 4/1973 | Taylor | 188/316 |
| 3,774,895 | | 11/1973 | Willich et al. | 267/136 |
| 3,797,818 | | 3/1974 | Willich et al. | 267/122 |
| 3,833,248 | | 9/1974 | Wössner et al. | 293/86 |
| 4,632,228 | | 12/1986 | Oster et al. | 188/282 |
| 5,295,563 | * | 3/1994 | Bennett | 188/299 |
| 5,376,138 | * | 12/1994 | Bouchard et al. | 188/322.19 |
| 5,392,885 | * | 2/1995 | Patzenhauer et al. | 188/299 |
| 5,533,596 | * | 7/1996 | Patzenhauer | 188/299 |
| 5,941,351 | * | 8/1999 | Etnyre | 188/322.17 |

FOREIGN PATENT DOCUMENTS

| | | | |
|---|---|---|---|
| 2137981 | 12/1972 | (FR) | 293/86 |
| 2146083 | 2/1973 | (FR) | 267/122 |
| 2194267 | 2/1974 | (FR) . | |
| 2202921 | 10/1988 | (GB) . | |

* cited by examiner

*Primary Examiner*—Robert J. Oberleitner
*Assistant Examiner*—Thomas J. Williams
(74) *Attorney, Agent, or Firm*—Fay, Sharpe, Fagan, Minnich & McKee, LLP (57) ABSTRACT

A shock absorber (1) having a longitudinal axis of rotation (XX') comprises a shock absorber body (2), a principal piston (4), which is supported by a piston rod (5), and a principal compression chamber (3), in which the principal piston (4) slides. The piston (4) divides the interior of the chamber (3) into a front internal portion and a rear internal portion. The sliding occurs wit the compression of the shock absorber (1) from the front to the rear internal portion. Further, the shock absorber (1) includes an elastic return device (8), a volume compensation device (9), hydraulic fluid (7), and at least one rolling channel. The rolling channel is comprised of at least one portion of the internal surface of the peripheral wall of the principal compression chamber (3) and at least one portion of the external wall of the principal piston (4).

13 Claims, 8 Drawing Sheets

LONGITUDINAL AXIS SHOCK ABSORBER WITH BYPASS CHANNEL

BACKGROUND OF THE INVENTION

The present invention relates to a shock absorber intended specifically to serve as stroke ending element, absorbing energy and which can be utilized in any activity requiring the stopping of masses in motion, e.g., to close an automatic door, to stop a conveyor, or in relation to controlling robotics, machine-tools, exercise equipment, press elements and others.

Numerous kinds of shock absorbers exist which permit resistance to shocks from masses in motion. However, these shock absorbers deteriorate relatively rapidly and their shock damping capacity decreases to the extent of their utilization. Their service life is unsatisfactory and defects in the piston guidance appear quickly resulting in rapid wear of the different components, fluid leaks or spring breakage. Furthermore, these shock absorbers do not allow attaining, by simple means, a damping curve, whose characteristics can be modified according to their specific application field.

The present invention proposes to solve these problems by suggesting a shock absorber whose functional and structural characteristics described below permit notable increase in its damping quality as well as its reliability and length of useful life.

SUMMARY OF THE INVENTION

In the subject invention, a shock absorber with a shock absorber body, a principal piston supported by a piston rod, a principal compression chamber in which slides the principal piston where the piston divides the interior of the chamber into an internal front portion and an internal rear portion where the piston slides from the front to the rear at the time of compression of the compression of the shock absorber, where there is an elastic return device, a volume compensation device, hydraulic fluid, a pressure relief channel where the pressure relief channel is constituted by the whole internal surface of the peripheral wall of the principal compression chamber along the length of the principal piston and the whole external peripheral wall of the principal piston.

According to a second embodiment of the present invention, the principal compression chamber has an internal peripheral surface of the transverse circular section, whose diameter is variable according to the longitudinal axis of rotation (XX').

According to a third embodiment of the present invention, the principal compression chamber has an internal peripheral surface of transverse circular section, whose diameter is constant according to the longitudinal axis of rotation (XX').

In an additional aspect of the present invention, the principal piston is equipped with a peripheral external cylindrical wall, the diameter of which is smaller than the diameter of the peripheral internal surface of the principal compression chamber.

In a further aspect of the present invention, the principal piston is equipped on its external wall with an annular rolling projection, whose external diameter is smaller than the diameter of the internal peripheral wall of the principal compression chamber.

In a further aspect of the present invention, the shock absorber is equipped with a secondary compression chamber and a flow system permitting the hydraulic fluid to circulate between the internal front portion of the principal compression chamber and the secondary compensation chamber.

The flow system can be constituted in part by flow grooves situated on the peripheral external wall of the principal compression chamber.

Another characteristic of the invention is that the volume compensation device is constituted by a secondary piston able to slide to the interior of the secondary compensation chamber, the piston being equipped with a device ensuring the tightness of the secondary chamber.

The elastic return device can be constituted by a return spring acting contrary to the sliding of the secondary piston and can be positioned as support on a stop wall integral with the body at one of its ends and on the rear portion of the secondary piston at the other end, the rear portion being the one which is not in contact with the hydraulic fluid contained in the secondary compensation chamber.

Still further advantages of the present invention will become apparent to those ordinarily skilled in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
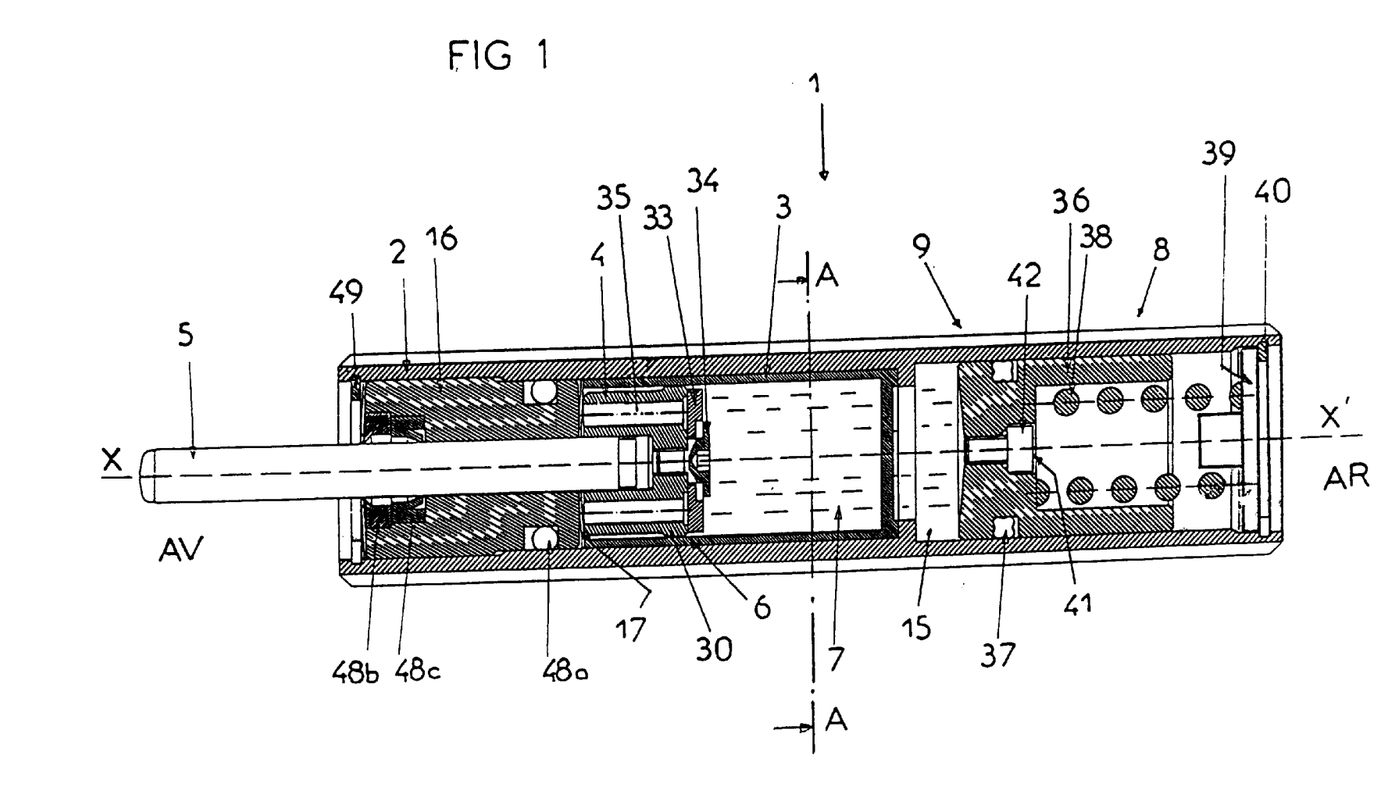
FIG. 1 is a view sectioned according to the median plane of the shock absorber.

In accordance with a first embodiment of the invention, the shock absorber 1 illustrated in FIG. 1 is constituted by a body 2 having a cylindrical shape, equipped with a principal compression chamber 3, in the interior of which a principal piston 4 supported by its piston rod 5 can slide in order to move in translation from the front (AV) to the rear (AR) and inversely. The sliding is effected according to a general axis (XX') of rotation of the shock absorber 1 and is produced when the shock absorber is compressed, from the front (AV) towards the rear (AR) counter to a hydraulic damping device 6 which transforms the kinetic energy of the piston into thermal energy of hydraulic fluid 7 contained in the body 2 of the shock absorber 1 the thermal energy being then dispersed in the air by the by the thermal gradient across the body 2.

The shock absorber 1 is also fitted with an resilient return device 8 permitting the return sliding of the principal piston 4 toward its position of rest at time of relaxation of the shock absorber 1 and with a volume compensation device 9 permitting compensation of volume occupied by fluid 7 by the piston rod 5 at the time of compression, and of the volume released by the withdrawal of the piston rod 5 from the fluid 7 at the time of relaxation.

Figure 2:
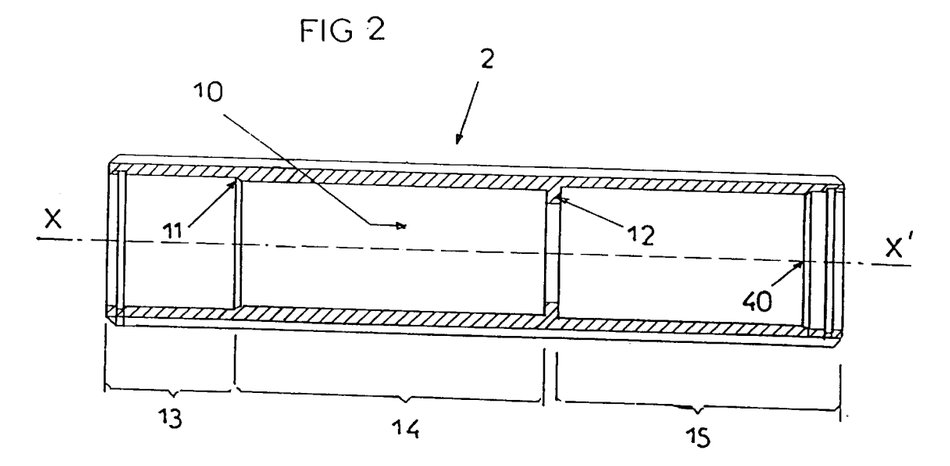
FIG. 2 is a view sectioned according to the same plane of the body of the shock absorber as in FIG. 1.

The body 2 of the shock absorber 1 illustrated more specifically in FIG. 2, has cylindrical shape and is hollowed out according to its axis (XX') of rotation into a longitudinal cylindrical hole 10, divided into three portions in succession by a narrowing of section 11 and an annular projection acting as internal annular stop 12. Thus, the hole comprises:

a front portion 13 destined to receive a guide and sealing ring 16 a middle portion 14 destined to receive the principal compression chamber 3 a rear portion, called the secondary compression chamber 15, which receives the resilient return device 8 and the volume compensation device 9.

The front portion 13 is equipped with a guide ring 16 permitting guidance of piston rod 5 sliding together with the principal piston 4, the ring 16 similarly seals the shock absorber 1 in the front portion 13, according to tightness means such as a torque joints, resilient washers, and O-rings 48a, 48b, 48c. In addition, the ring 16 is retained in the front position 13 thanks to a spring washer 49, more commonly called a snap ring.

Figure 5:
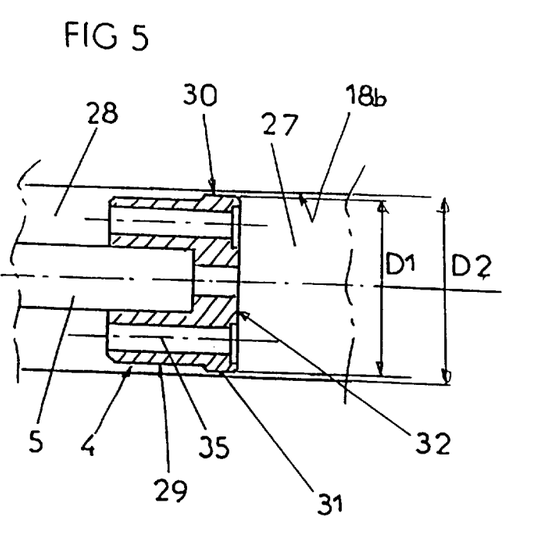
FIG. 5 represents the piston sectioned in the median plane.
Figure 6:
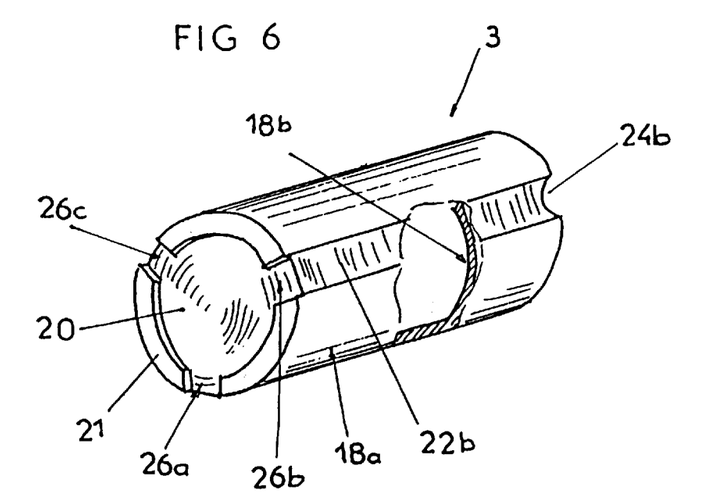
FIG. 6 is a perspective view of the compression chamber.
Figures 7, 8:
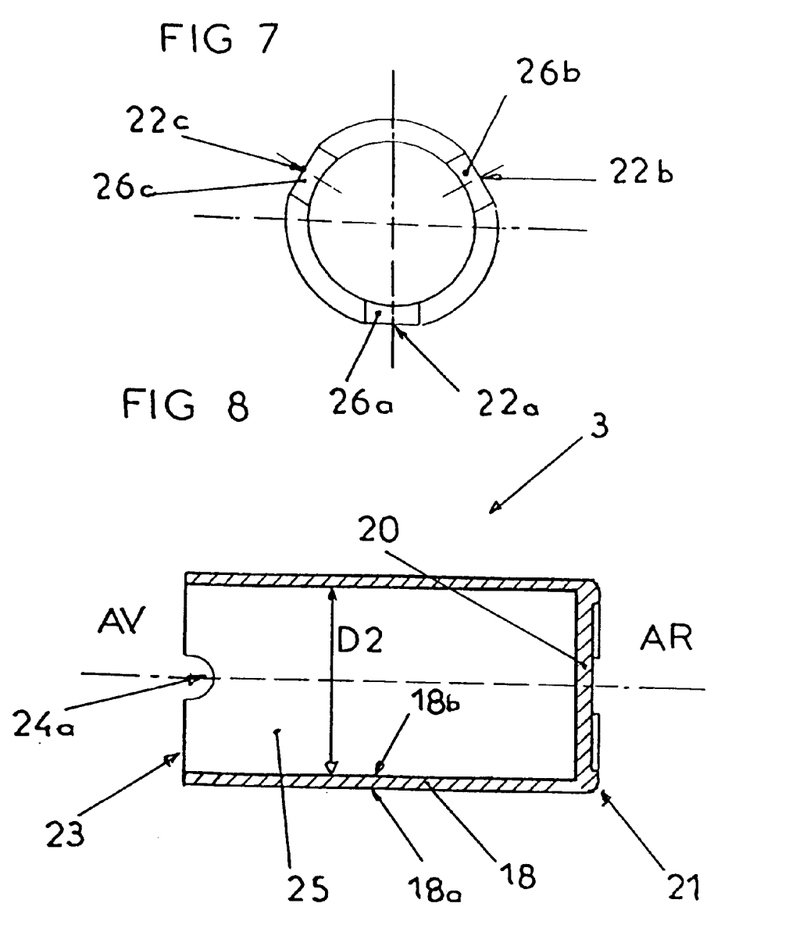
FIGS. 7, 8, and 9 are respectively sectioned front and rear views of the compression chamber.
Figure 9:
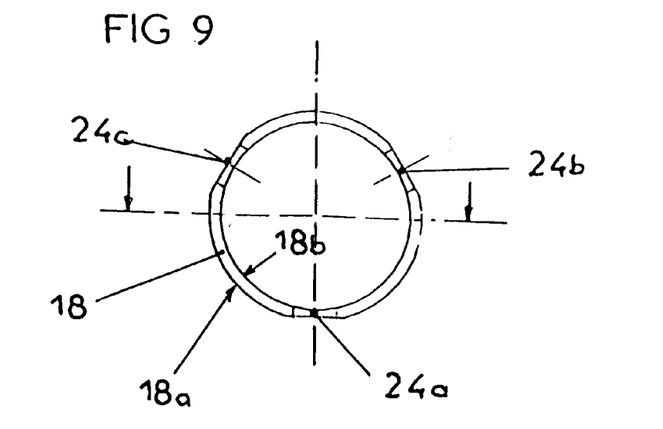
Figure 10:
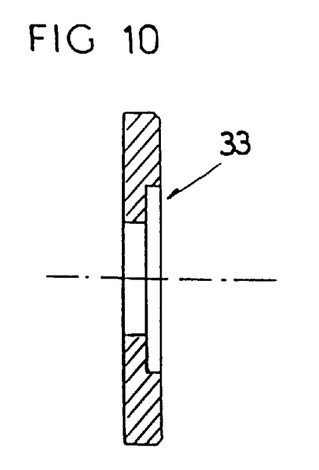
FIGS. 10 and 11 respectively represent the valve in longitudinal section and the valve screw in the exterior view.
Figure 11:
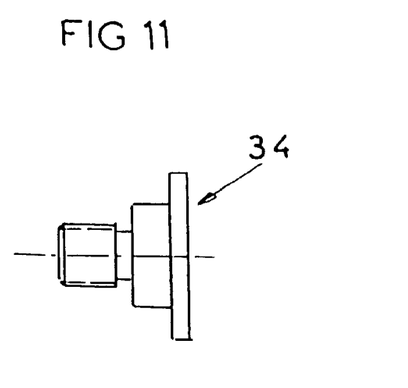

According to the preferred embodiment, the principal compression chamber 3, in the interior of which the sliding of the principal piston 4 takes place, comprises an independent piece which is located as support on the annular internal stop 12 of the body 2 of the shock absorber 1 and on the rear end wall 17 of the guide ring 16. The chamber 3, illustrated in FIGS. 5, 6, and 7, comprises a cylindrical tube with tubular peripheral wall 18, as well as a transverse wall at the rear end 20, forming the bottom of the chamber 3. The chamber 3 is open in its front portion and the peripheral external wall projects towards the rear beyond the wall of the rear extremity 20, the end projection 21 forms the ledge against the internal annular stop 12 of the body 2.

The external surface 18a of the external cylindrical peripheral wall 18 comprises three flat, longitudinal zones 22a, 22b, 22c in order to create three discharge grooves 220a, 220b, 220c (see FIG. 3) alongside the generators, which allows the hydraulic fluid 7 to circulate between the external surface 18a and the body 2 of the shock absorber 1. At the front end 23 of the principal compression chamber 3 the discharge grooves end in front radial slots 24a, 24b, 24c traversing the peripheral wall 18 permitting the hydraulic fluid 7 to circulate between the interior of the chamber 25 and the discharge grooves 220a, 220b, 220c. At the rear extremity of the chamber 25, the discharge grooves 220a, 220b, 220c also end in rear radial slots 26a, 26b, 26c traversing the projecting end 21 of the external peripheral surface 18, permitting circulation of hydraulic fluid 7 between the grooves 220a, 220b, 220c and the secondary volume compensation chamber 15.

Figure 3:
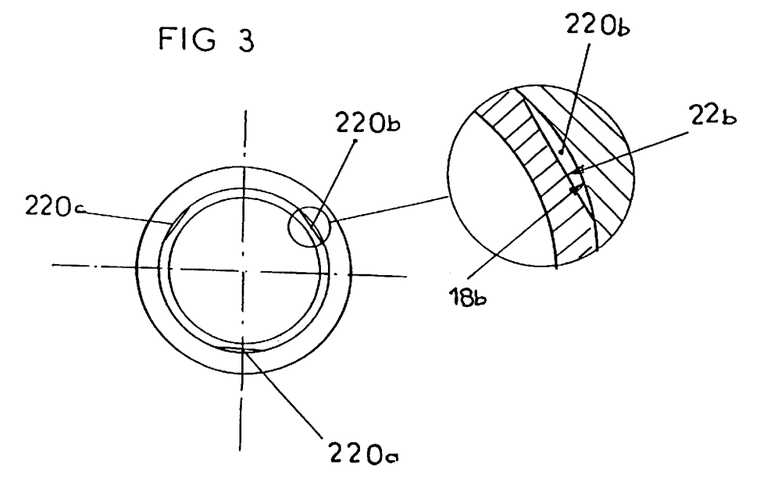
FIG. 3 is a view sectioned according to line AA of FIG. 1.
Figure 4:
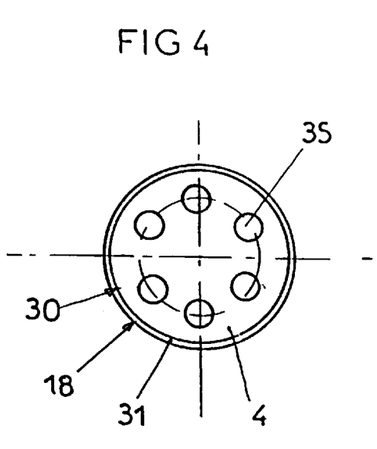
FIG. 4 is an end view of the principal piston in its housing.

The radial slots, in the front 24a, 24b, 24c, and rear 26a, 26b, 26c and the discharge grooves 220a, 220b, 220c constitute the discharge system of the hydraulic fluid 7.

In accordance with the preferred embodiment of the present invention, a principal piston 4 maintained by its piston rod 5 slides in the interior of the principal compression chamber 3, defining at the rear of the piston an internal rear portion 27 and in front of the piston an internal front portion 28 of the compression chamber 3, the volumes of which vary at time of movement.

According to the preferred embodiment, the piston 4 illustrated in FIGS. 1 to 5, has a cylindrical shape and on the periphery of its external wall 29 an annular rolling projection 30 whose external diameter (D1) is slightly smaller than the interior diameter (D2) of the peripheral wall 18 of the principal compression chamber 3, in such manner that, at the time when the principal piston 4 is moving from the front (AV) towards the back (AR), that is to say at the moment of compression, the hydraulic fluid contained in the rear portion 27 of the chamber 3 is forced during discharge toward the internal front portion 28 of the chamber 3 via a pressure relief channel 31 constituted by the space which exists between the annular rolling projection 30, and the peripheral wall 18 of the principal compression chamber 3, and, more specifically, an internal peripheral surface 18b. The hydraulic fluid 7 and the annular projection 30, as well as the peripheral internal surface 18b of the principal chamber 3, constitute the hydraulic damping device 6 of the shock absorber 1.

In addition, the piston 4 is equipped at its rear extremity 32 with a valve 33 maintained by a valve screw 34 allowing for some longitudinal play between a closed position and an open position according to (XX'). The valve 33 permits obstruction or freeing up of the return orifices 35 constituted by longitudinal holes realized in the interior of the piston 4. According to the preferred embodiment of the present invention, there are six return orifices 35 and they are positioned, at regular intervals along a circle with smaller diameter than the minimum diameter of the external wall 29 of the piston 4. The system functions in a known manner at time of compression the piston 4 undergoes a translation from the front to the rear and the pressure of the fluid 7 in the internal rear portion 27 of the chamber 3 pushes the valve 33 to closed position, the return orifices 35 being closed, the hydraulic fluid 7 flows via the pressure relief channel 31. On relaxation, the pressure of the fluid 7 in the internal front portion 28 causes the opening of the return orifices 35 by pushing the valve 33 in its open position and thus allows flow of the hydraulic fluid 7 via the return orifices 35 from the internal front portion 28 toward the internal rear portion 27 of the principal chamber 3.

According to the preferred embodiment of the present invention, the volume compensation device 9 is constituted by a secondary piston 36 equipped with a sealing washer 37 which slides lengthwise in relation to (XX') the secondary compensation chamber 15 in order to permit the hydraulic fluid 7 to flow into the interior of the secondary chamber 15 at the time of the compression, as will be described later on.

The sliding of the secondary piston 36 is controlled by the elastic return device 8 constituted by a spring 38 supported at one end on a stop wall 39 integral with the rear extremity of the body 40 and at its other extremity on the rear part of the secondary piston 41. Moreover, the secondary piston 36 is equipped in its center with a draining screw 42.

Figure 21:
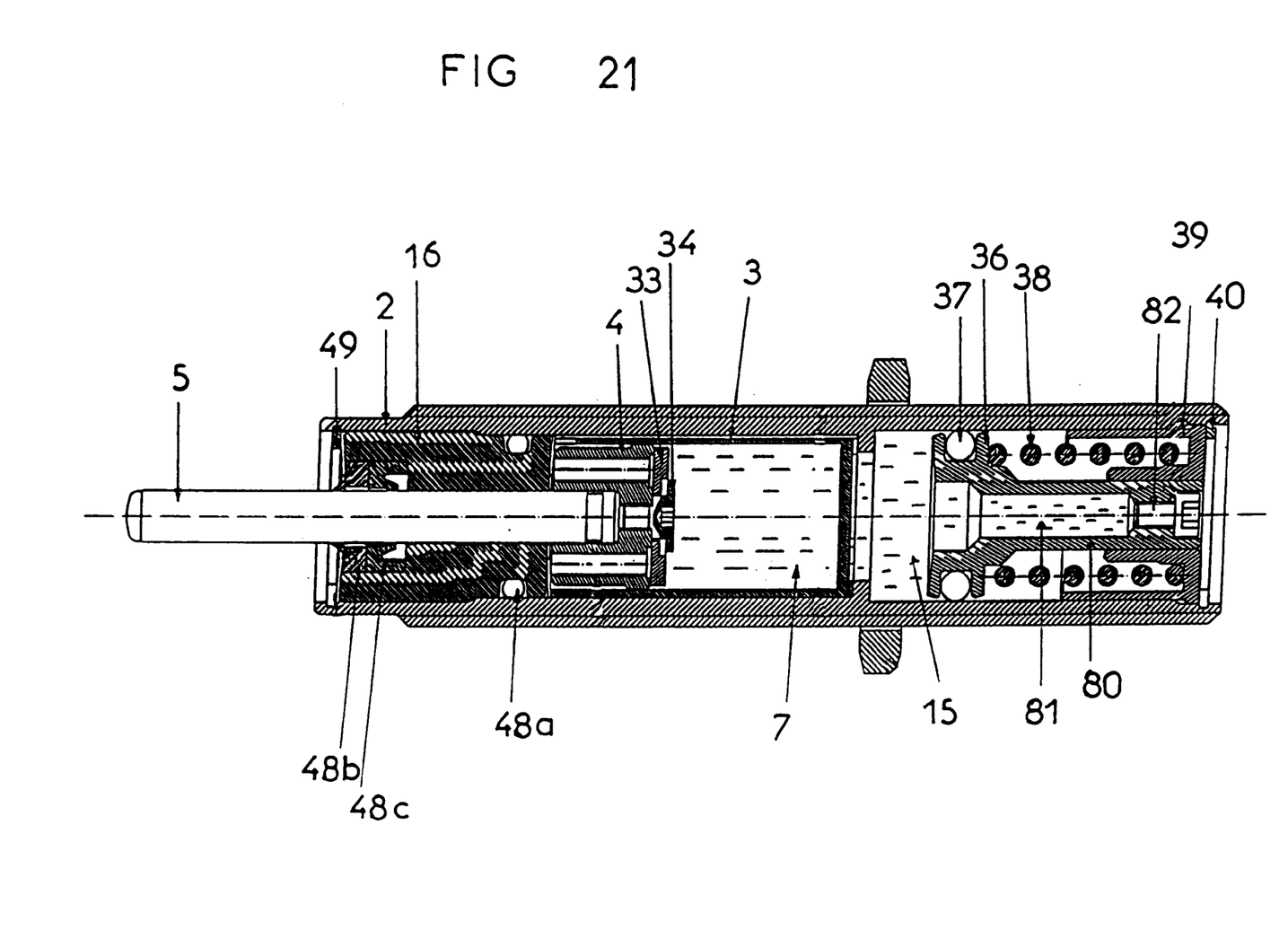
FIG. 21 represents in a view similar to the view of FIG. 1, a variation of the preferred embodiment of the invention comprising a different construction of the volume compensation device.

According to a variation of the preferred embodiment of the present invention, as illustrated in FIG. 21, the volume compensation device 9 comprises a secondary piston 36 equipped with a O-ring 37, the piston being supported by a piston rod 80 and which allows it to slide to the interior of the secondary chamber 15 according to axis (XX'). The sliding takes place counter to an elastic return device of the type described previously, comprising a spring 38. The piston and its rod include bore 81 located at an extremity on the secondary compensation chamber 15 fitted with a draining valve 82 at the other extremity, as depicted in FIG. 21. It should be noted that according to this variation, the rear extremity of the piston rod which includes the draining screw which is located on the outside of the body 2 of the shock absorber in order to permit easy access to the draining screw. According to this variation, the end of the piston rod 80 can, for example, beneficially allow verification of the hydraulic fluid 7 level and serve as an indicator of wear.

Thus, in the first embodiment illustrated in FIGS. 1 to 10, at the time of compression of the shock absorber, the hydraulic fluid 7 is forced from the internal rear portion 27 toward the internal front portion 28 of the principal chamber 3 via the pressure relief channel 31, the volume occupied by the rod of the piston 5 in the internal front portion 27 obliges an equivalent portion of the volume to discharge along the discharge grooves 220a, 220b, 220c from the interior 25 of the principal compression chamber 3 toward the secondary compensation chamber 15, the hydraulic fluid 7 under pressure in the secondary chamber 15 causes translation of the secondary piston 36 compressing the return spring 38 until pressure balance is established between the pressure on the piston rod 5 and the return force of the spring 38 through intervention of the hydraulic fluid 7. When the force applied to the principal piston 4 by intervention of its rod 5 is released, the return force of the spring 38 forces the hydraulic fluid 7 to make use of the reverse circuit up to the internal front portion 28 of the principal chamber 3 and from there to issue toward the internal rear portion 27 by means of the return orifices 35.

Figure 12:
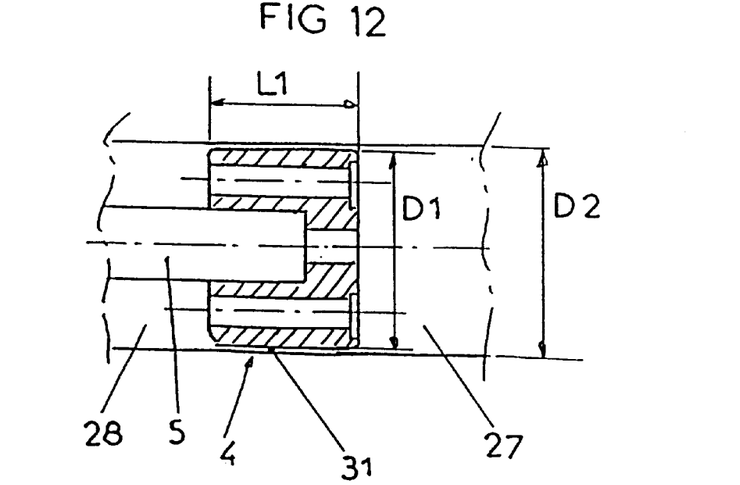
FIG. 12 represents a different embodiment of the piston in longitudinal section.

As seen in FIG. 12, there is depicted a variation of the preferred embodiment where the piston 4 does not have any rolling projection 30, but an external cylindrical wall 29, slightly smaller in diameter (D1) than the diameter (D2) of the internal peripheral wall 19 of the principal compression chamber 3. Thus the hydraulic fluid 7 is not forced over the projection but along the entire length (L1) of the principal piston 4.

Figure 13:
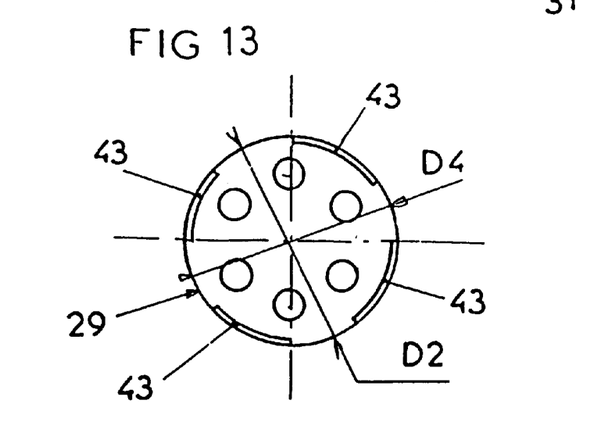
FIG. 13 represents an end view of another embodiment variation of the principal piston.

According to another embodiment of the present invention, as illustrated in FIG. 13, the peripheral external wall 29 of the piston 4 has a diameter (D4) whose operating play is close to the interior diameter (D2) of the peripheral internal wall 19 of the chamber 3. In order to permit the sliding of the piston 4, the pressure relief channel 31 is now constituted by grooves 43 arranged along the external peripheral wall 29 as shown in the FIG. 13. The grooves 43 can have various shapes and dimensions.

Figure 14:
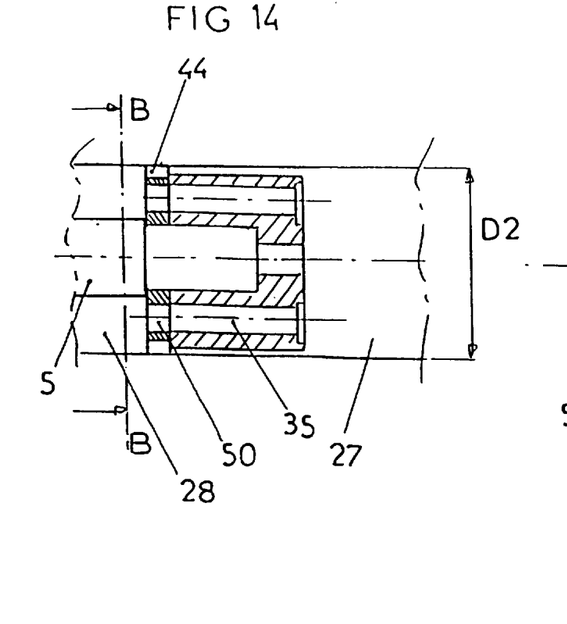
FIGS. 14 and 15 relate to another embodiment variation of the piston rod and principal piston assembly, FIG. 14 being a sectional view according to a longitudinal plane, FIG. 15 being a sectional view according to line BB.
Figure 15:
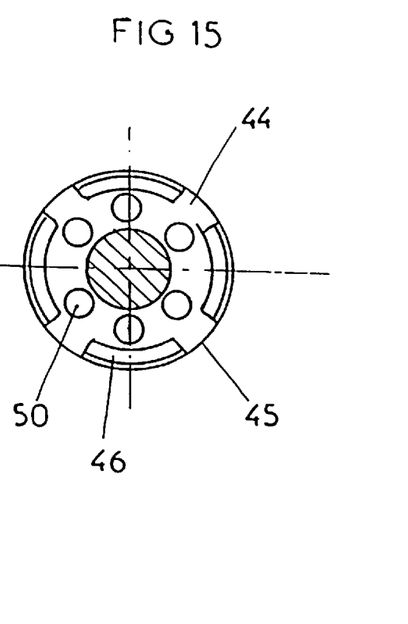
Figure 16:
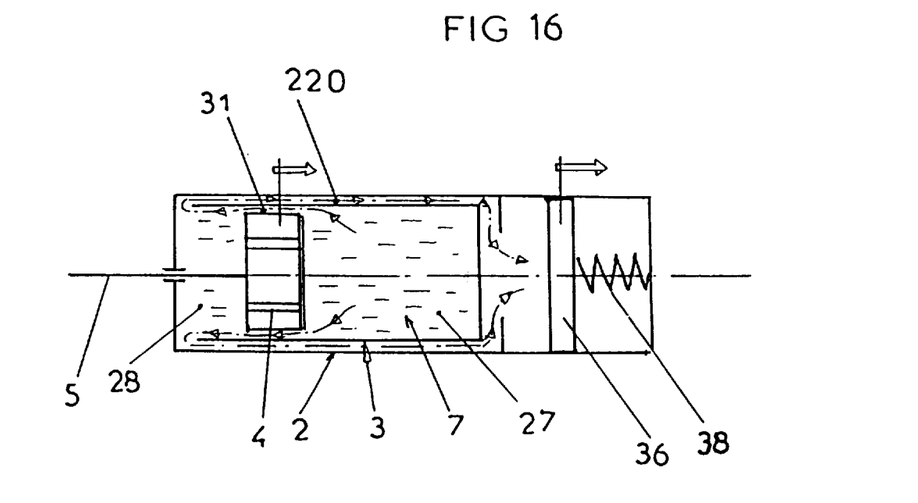
FIG. 16 is a schematic view illustrating the travel of the compressed fluid.

In another embodiment of the present invention, as illustrated in FIGS. 14 and 15, the assembly of piston rod 5 and principal piston 4 can be equipped with an intermediary guide washer 44 placed between the piston 4 and the piston rod 5, integral with the unit, and which can be constituted by a cylindrical ring, whose exterior diameter (D5) is nearly equal to the operating internal diameter (D2) of the peripheral wall of the chamber, and which has flow releasers 46 for fluid along its external peripheral wall 45. The cylindrical washer 44 also comprises holes 50 positioned relative to holes 35 in such manner so as to permit discharge of hydraulic fluid 7 via the return orifices 35 from the principal piston 4.

Figure 17:
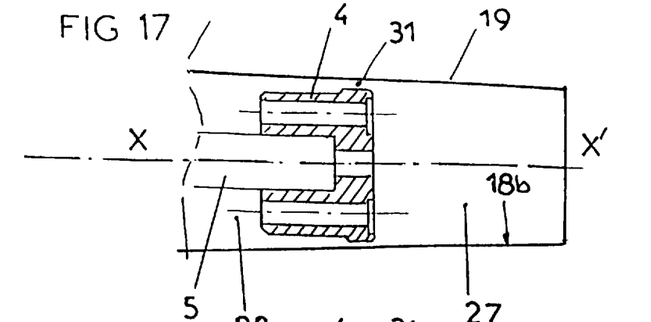
FIGS. 17 to 20 represent sections of different embodiment variations of the principal compression chamber with variable cross-section.
Figure 18:
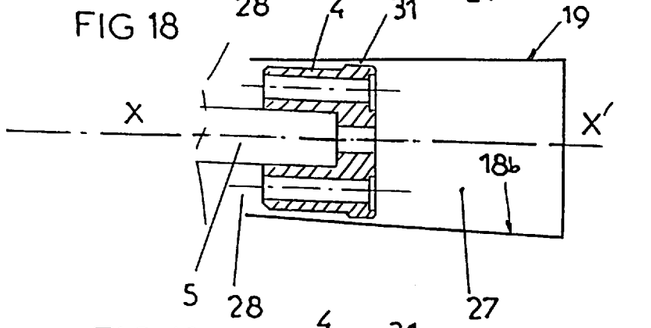
Figure 19:
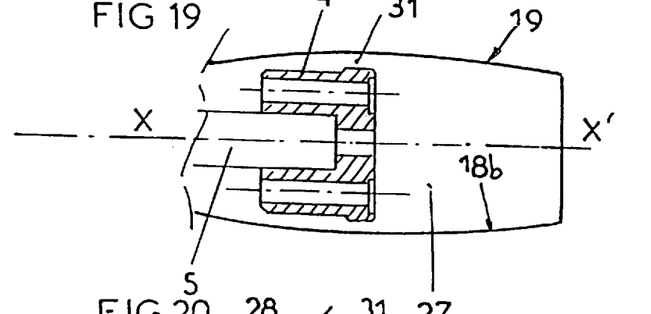
Figure 20:
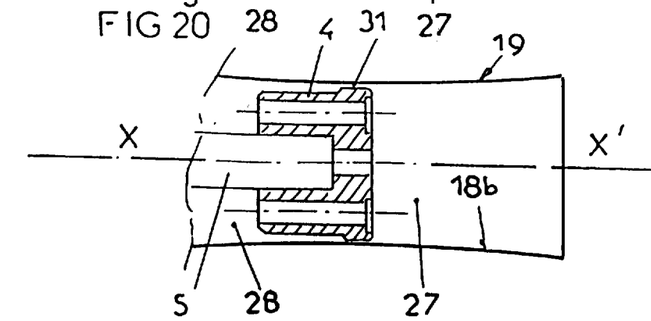

As it was seen in the first embodiment of the present invention, and its variations thereof, which were illustrated in FIGS. 1 to 12, the pressure relief channel 31 is constant, regardless of the position of the principal piston, but it could also be otherwise, as is illustrated schematically in FIGS. 17, 18, 19, and 20. These Figures illustrate four variations according to which the interior diameter (D2) of the external peripheral wall 18 of the principal compression chamber 3 is variable according to axis (XX'), in a manner so as to vary the width of the pressure relief channel 31 during the sliding movement of the principal piston 4, thus obtaining a variable damping. The variation of the interior chamber (D2) can, for example, be conical with a front diameter greater than the rear diameter, provoking a gradual growth in damping at the time of compression, as shown in FIG. 17, or inversely a rear diameter greater than the front diameter, so as to obtain strong damping at the onset of the compression and a weaker damping at the end of the compression, as illustrated in FIG. 18. Therefore, a damping curve is obtained (damping force in proportion to the travel of the principal piston) in the desired form by effectuating a principal compression chamber (3) for which one causes the interior diameter (D2) to be varied in an appropriate manner.

In another variation of the preferred embodiment of the present invention, the elastic return device 8 and the compensation device 9 can, for example, be placed radially relative to the body 2 of the shock absorber 1, the return spring 38 acting via the intermediary of the secondary piston 36 of the hydraulic fluid 7, the device is located at the desired place by means of adequate modification of the configuration of the body 2.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A shock absorber with a longitudinal axis comprising:
   a shock absorber body;
   a peripheral wall element having an internal peripheral surface that defines a principal compression chamber, the peripheral wall element being mounted within the shock absorber body;
   a principal piston supported by a piston rod sliding in the principal compression chamber, the piston having an external peripheral wall extending peripherally therearound, said piston dividing an interior of said principal compression chamber into a front portion and a rear portion, said piston sliding from front to rear when the shock absorber is compressed;
   a volume compensation device fluidly connected with the principal compression chamber;
   hydraulic fluid disposed in the principal compression chamber and the volume compensation device;
   an annular pressure relief channel defined between the internal surface of the peripheral wall and a fixed diameter cylindrical section at the maximum diameter of the piston of the external peripheral wall of the principal piston, the pressure relief channel extending peripherally around the principal piston.

2. The shock absorber according to claim 1, wherein the internal peripheral surface is circular in transverse section and has a diameter that is non-constant along the longitudinal axis.

3. The shock absorber according to claim 1, wherein:
the internal peripheral surface is a cylinder whose diameter is constant along the longitudinal axis.

4. The shock absorber according to claim 1, wherein the principal piston further includes:
a peripheral cylinder external wall having a diameter which is smaller than the internal diameter of peripheral wall of the principal compression chamber.

5. The shock absorber according to claim 1 further including:
a discharge channel defined between the shock absorber body and the peripheral wall element, the discharge channel connecting the front portion of the principal compression chamber to the volume compensation device.

6. A shock absorber with a longitudinal axis comprising:
a shock absorber body within which a principal compression chamber is defined;
hydraulic fluid in the principal compression chamber;
a principal piston supported by a piston rod sliding in the principal compression chamber, said piston dividing an interior of said principal compression chamber into a front portion and a rear portion, said piston sliding rearward along the longitudinal axis to compress the rear portion when the shock absorber is compressed causing hydraulic fluid to flow from the rear portion into the forward portion through a pressure relief channel;
a volume compensation device fluidly connected with the principal compression chamber to receive hydraulic fluid, the volume compensation device including:
a secondary compensation chamber defined adjacent and in axial alignment along the longitudinal axis and end-to-end with the rear portion,
a discharge channel that permits the hydraulic fluid to circulate between the front portion of the principal compression chamber and the secondary compensation chamber.

7. The shock absorber according to claim 6, wherein the principal piston includes:
an external peripheral wall having an external diameter smaller than an interior diameter of the principal compression chamber to define the pressure relief channel therebetween.

8. The shock absorber according to claim 6, wherein the volume compensation device further includes:
a secondary piston sliding in an interior of the secondary compensation chamber.

9. The shock absorber according to claim 8, wherein the volume compensation device further includes:
a return spring acting counter to sliding movement of said secondary piston.

10. The shock absorber according to claim 9, wherein the return spring is supported at one end on a stop wall integral with a rear extremity of the body and at its other end on a rear part of the secondary piston.

11. A shock absorber comprising:
a shock absorber body;
a principal piston supported by a piston rod sliding in a principal compression chamber defined by an interior peripheral surface of a peripheral wall, said piston dividing an interior of said principal compression chamber into a front portion and a rear portion;
hydraulic fluid in the principal compression chamber;
a volume compensation device fluidly connected with the principal compression chamber to receive hydraulic fluid, the volume compensation device including:
a secondary compensation chamber,
grooves defined along an external peripheral surface of the peripheral wall of the principal compression chamber, which grooves permit the hydraulic fluid to circulate between the front portion of the principal compression chamber and the secondary compensation chamber.

12. A shock absorber comprising:
a cylindrical body extending along a longitudinal axis;
a compression chamber defining body fixedly mounted within the cylindrical body;
a piston slidably received in the compression chamber dividing the compression chamber into a front portion on a forward side of the piston and a rear portion on a rearward side of the piston;
a piston rod connected to the forward side of the piston;
the piston and the compression chamber body defining a pressure relief passage therebetween such that fluid flows from the rear portion to the front portion through the pressure relief passage at a controlled rate, the piston defining a fluid return passage therethrough;
at least one check valve mounted to the piston to permit fluid to flow freely from the front portion through the fluid return passage to the rear portion as the piston moves forward and for blocking fluid from flowing through the fluid return passage to the front portion as the piston moves rearward; and,
a volume compensation passage extending from the compression chamber front portion to a resiliently expandable chamber such that as the piston moves rearward and fluid flows into the front portion, fluid displaced by the piston rod flows into the expandable chamber causing it to expand and as the piston moves forward fluid is resiliently urged to flow from the expandable chamber into the front portion and from the front portion through the check valve to the rear portion.

13. The shock absorber according to claim 12 wherein the volume compensation passage is defined longitudinally between the cylindrical body and the compression chamber body.

* * * * *